United States Patent
Son et al.

(10) Patent No.: US 10,228,876 B2
(45) Date of Patent: Mar. 12, 2019

(54) MEMORY APPARATUS INCLUDING MULTIPLE BUFFERS AND METHOD OF DRIVING MEMORY INCLUDING MULTIPLE BUFFERS

(71) Applicant: SAMSUNG ELECTRONICS CO., LTD., Suwon-si (KR)

(72) Inventors: Minyoung Son, Hwaseong-si (KR); Jongpil Son, Seongnam-si (KR); Minkyu Jeong, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 80 days.

(21) Appl. No.: 15/400,103

(22) Filed: Jan. 6, 2017

(65) Prior Publication Data

US 2017/0199697 A1 Jul. 13, 2017

(30) Foreign Application Priority Data

Jan. 12, 2016 (KR) ........................ 10-2016-0003673

(51) Int. Cl.
*G09G 5/399* (2006.01)
*G06F 3/06* (2006.01)
*G09G 5/39* (2006.01)
*G06F 13/16* (2006.01)
*G06T 1/60* (2006.01)
*G09G 5/393* (2006.01)

(52) U.S. Cl.
CPC .......... *G06F 3/0635* (2013.01); *G06F 3/0613* (2013.01); *G06F 3/0631* (2013.01); *G06F 3/0656* (2013.01); *G06F 3/0683* (2013.01); *G06F 13/1673* (2013.01); *G06T 1/60* (2013.01); *G09G 5/39* (2013.01); *G09G 5/393* (2013.01); *G09G 5/399* (2013.01); *G09G 2352/00* (2013.01); *G09G 2360/122* (2013.01); *G09G 2360/18* (2013.01)

(58) Field of Classification Search
None
See application file for complete search history.

(56) References Cited

U.S. PATENT DOCUMENTS 5,008,838 A 4/1991 Kelleher et al.
5,371,839 A * 12/1994 Fukunaga ............... G06T 15/80
345/589

(Continued)

FOREIGN PATENT DOCUMENTS

EP 2172927 A1 4/2010

OTHER PUBLICATIONS

Peterson, Gary L. "Concurrent reading while writing." ACM Transactions on Programming Languages and Systems (TOPLAS) 5.1 (1983): 46-55. (Year: 1983).*

(Continued)

*Primary Examiner* — Ryan M Gray
(74) *Attorney, Agent, or Firm* — Harness, Dickey & Pierce, P.L.C.

(57) ABSTRACT

A memory apparatus including multiple buffers includes a memory controller configured to obtain memory allocation information based on a multi-write operation command, and a memory configured to store same graphics data in each of multiple buffers in a memory based on the memory allocation information.

20 Claims, 15 Drawing Sheets

(56) References Cited

U.S. PATENT DOCUMENTS

| | | | |
|---|---|---|---|
| 5,793,996 A * | 8/1998 | Childers | G06F 13/4027 345/520 |
| 6,262,748 B1 | 7/2001 | Deering et al. | |
| 6,587,112 B1 * | 7/2003 | Goeltzenleuchter | G06T 1/60 345/532 |
| 6,862,729 B1 | 3/2005 | Kuch et al. | |
| 2008/0260021 A1 | 10/2008 | Sung | |
| 2009/0184972 A1 * | 7/2009 | Weybrew | G06T 15/005 345/548 |
| 2009/0225088 A1 * | 9/2009 | Aoki | G09G 5/399 345/501 |
| 2011/0279463 A1 * | 11/2011 | Yang | G06T 1/60 345/522 |
| 2012/0166742 A1 * | 6/2012 | Wang | H03M 13/2957 711/154 |
| 2012/0246379 A1 * | 9/2012 | Kelleher | G06F 12/0607 711/5 |
| 2013/0009975 A1 * | 1/2013 | Hendry | G06T 1/20 345/545 |
| 2013/0135351 A1 | 5/2013 | Tripathi et al. | |
| 2017/0301057 A1 * | 10/2017 | Metcalfe | G06T 1/60 |

OTHER PUBLICATIONS

Palm, Emanuel. "Graphics' Card Utility withWebGL and N-Buffering: Improving performance using N-buffer strategies with WebGL." (2014). (Year: 2014).*

European Search Report dated May 23, 2017 for corresponding European Patent Application No. 16206510.6.

* cited by examiner

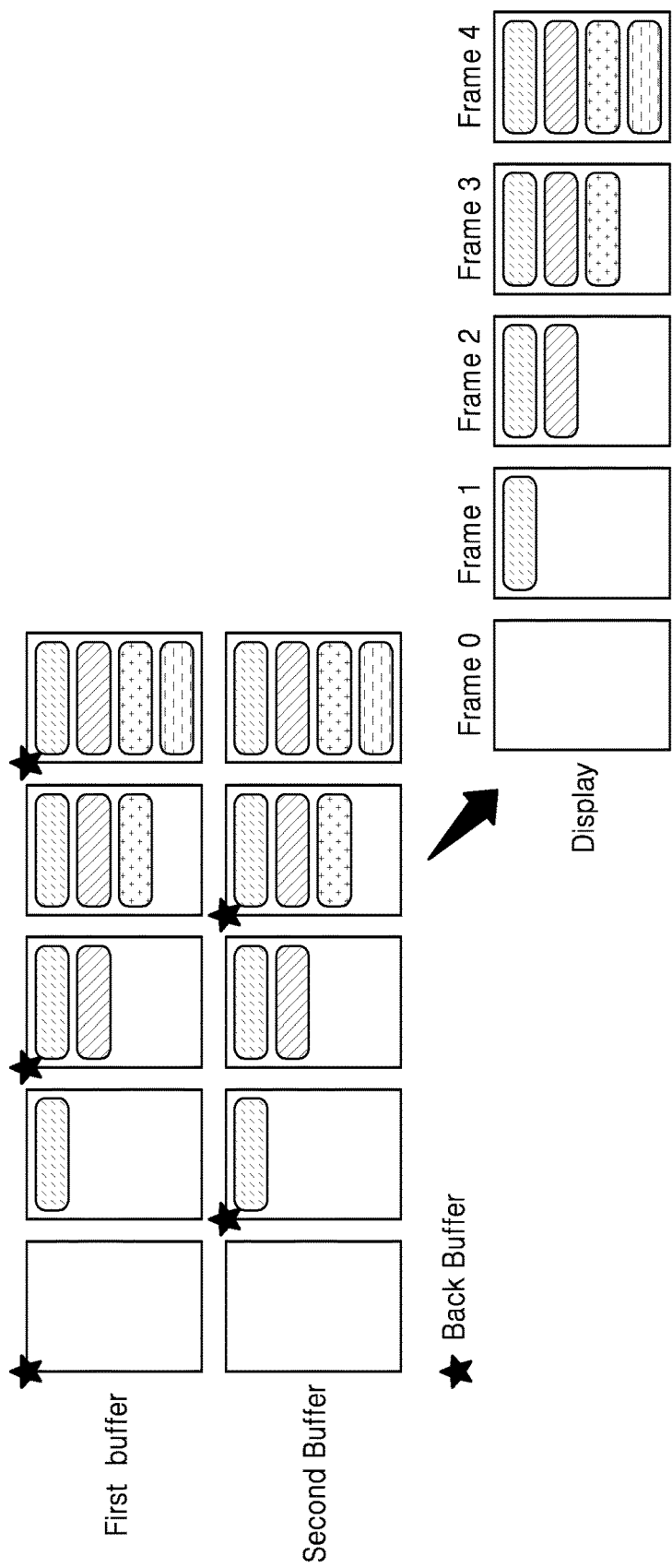

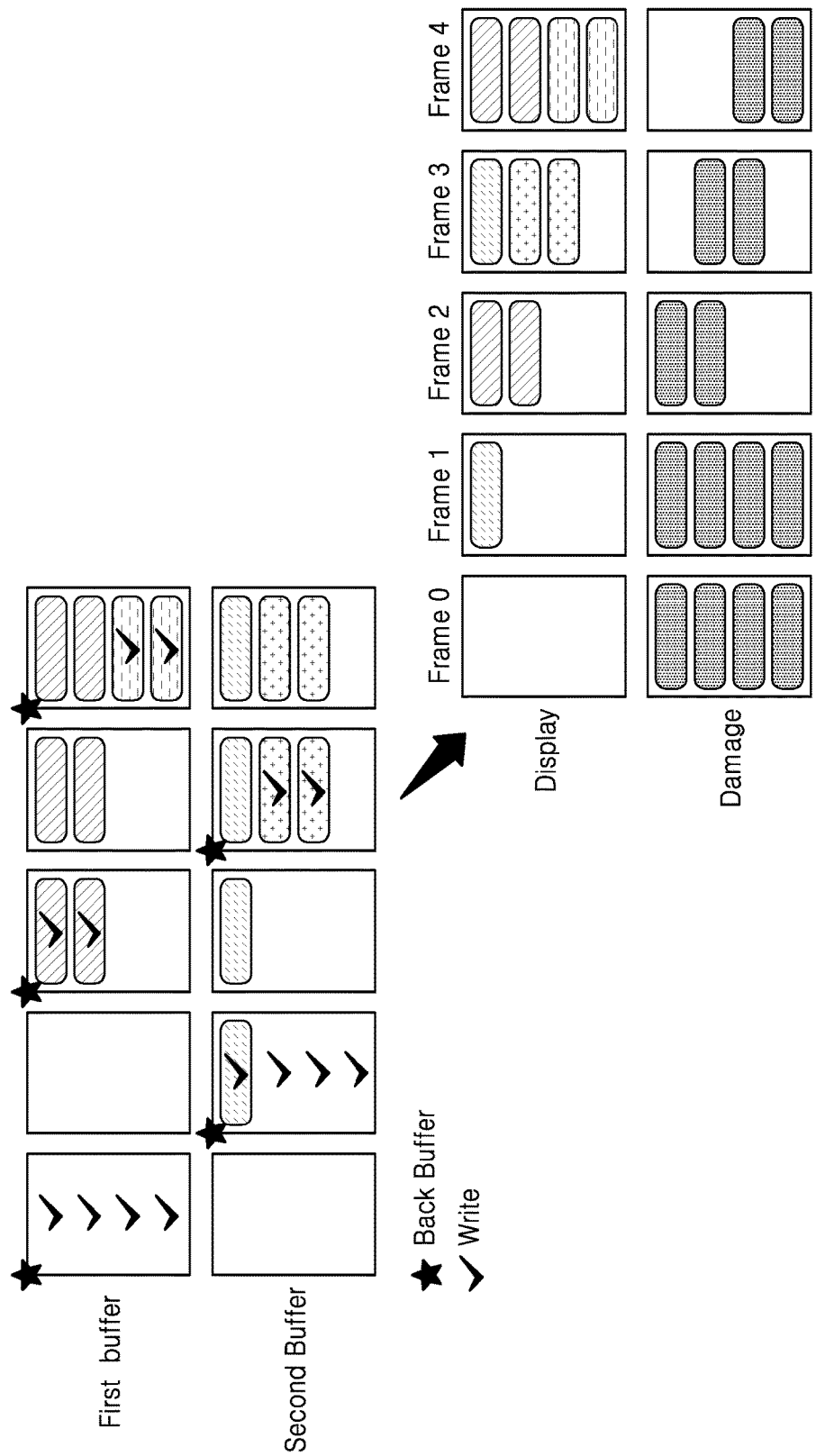

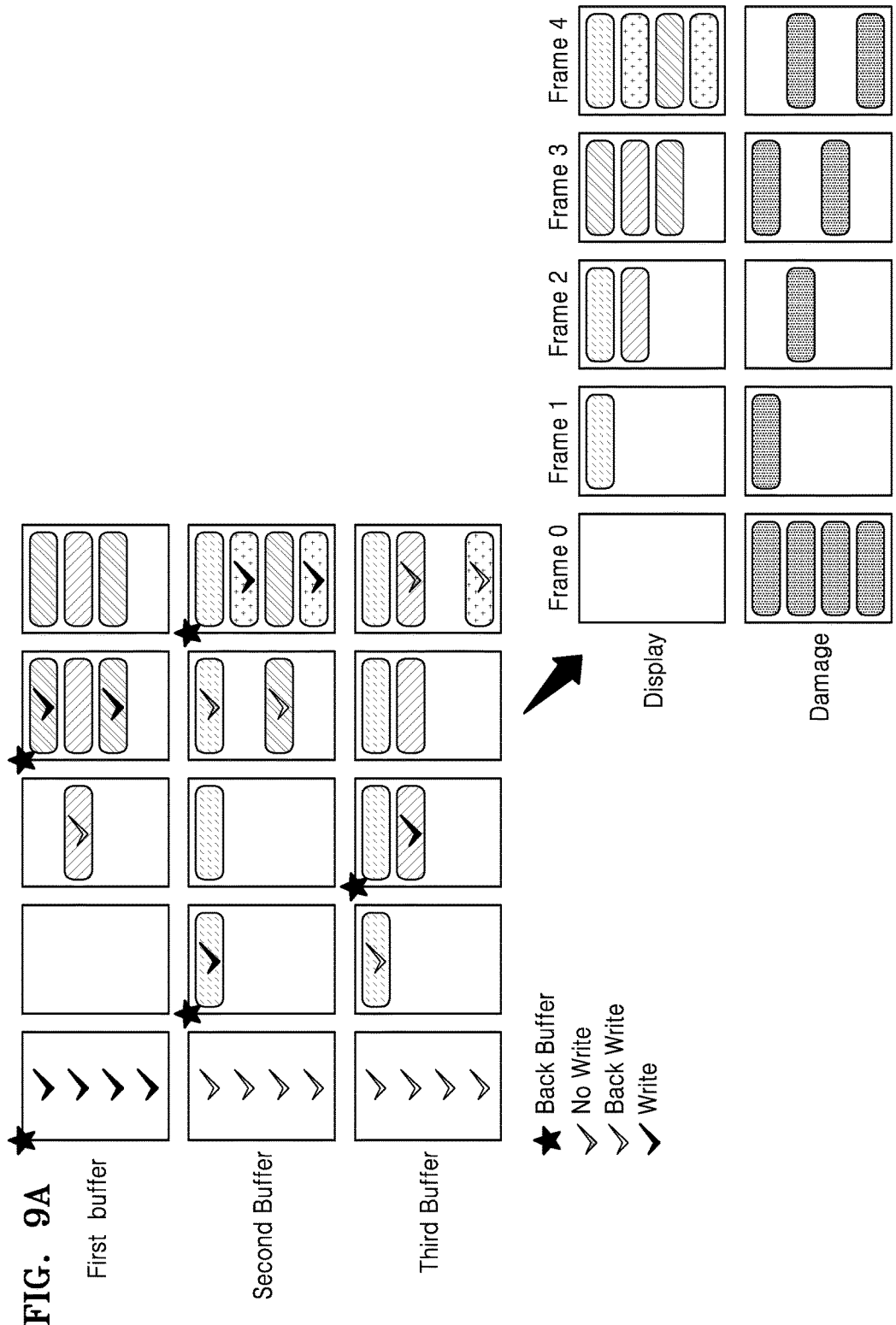

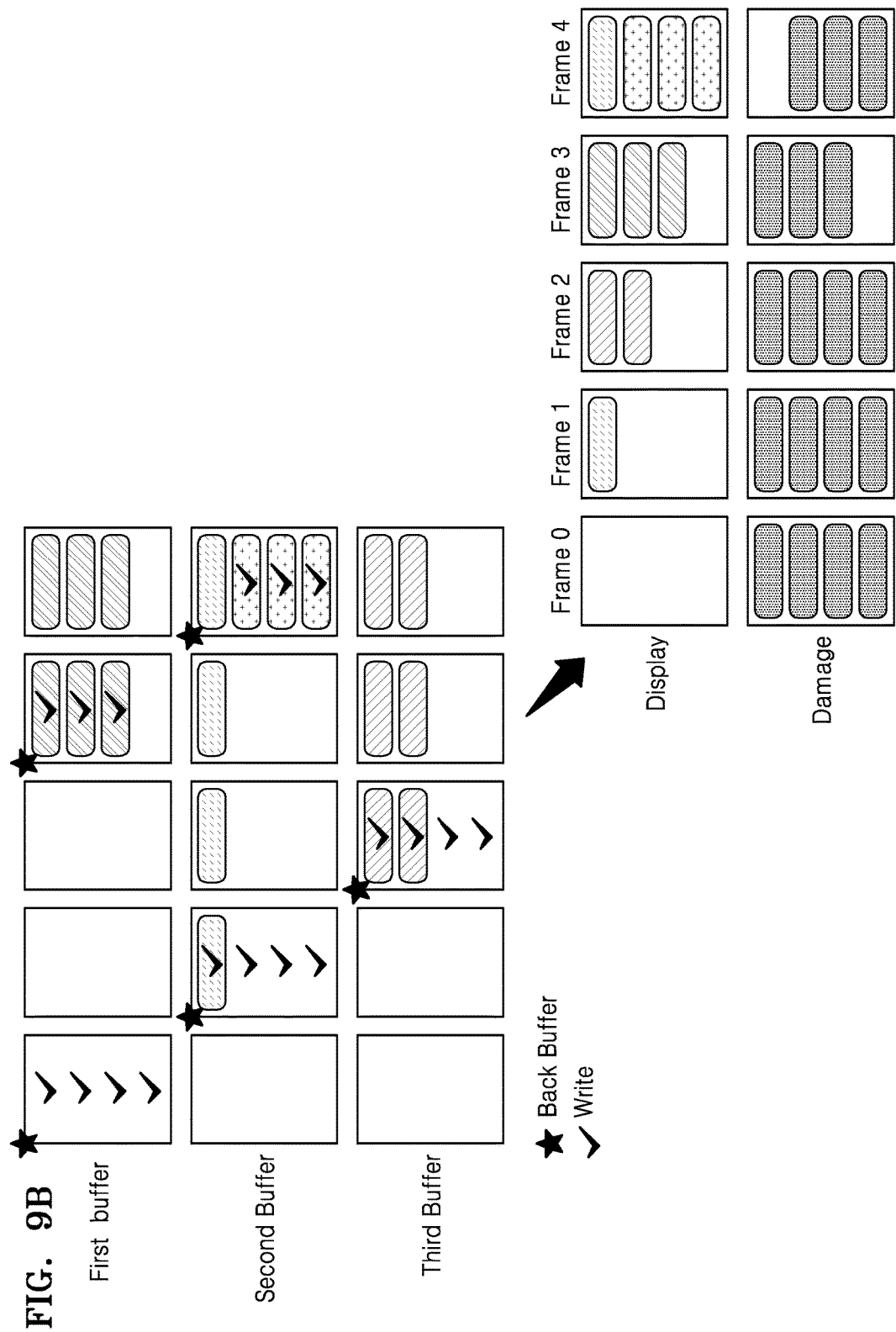

MEMORY APPARATUS INCLUDING MULTIPLE BUFFERS AND METHOD OF DRIVING MEMORY INCLUDING MULTIPLE BUFFERS

CROSS-REFERENCE TO RELATED APPLICATIONS

This application claims the benefit under 35 USC 119(a) of Korean Patent Application No. 10-2016-0003673 filed on Jan. 12, 2016 in the Korean Intellectual Property Office, the entire disclosure of which is incorporated herein by reference for all purposes.

BACKGROUND

1. Field

The following description relates to a memory apparatus including multiple buffers and a method of driving a memory including multiple buffers.

2. Description of Related Art

In a single buffer, a processor processes data after the data is stored in a buffer through a channel. In this case, data is unable to be processed while another piece of data is stored through the channel, and data is unable to be stored while the processor is processing another piece of data.

In double buffers, storing and processing of data may be simultaneously performed. While data is stored in a first buffer through a channel, a processor may process data in a second buffer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a memory apparatus including multiple buffers includes a memory controller configured to obtain memory allocation information based on a multi-write operation command, and a memory configured to store same graphics data in each of the multiple buffers based on the memory allocation information.

The memory controller may obtain, as the memory allocation information, a location of each of the multiple buffers in which the same graphics data is to be stored, according to a multi-write operation command.

The memory controller may receive the multi-write operation command from a graphics processor, and may determine a memory address and an offset for performing a multi-write operation, based on the multi-write operation command.

The memory controller may obtain the memory allocation information based on a parameter included in the multi-write operation command and a layout of the memory.

The memory may store the same graphics data simultaneously in the multiple buffers.

In response to the memory being driven according to a double buffer method, the memory may store the same graphics data in each of a proxy buffer that substitutes for a buffer on which a read operation is performed, and a buffer on which a read operation is not performed.

In response to the memory being driven according to an Nth multiple buffer method, wherein N is an integer equal to or greater than 3, the memory may store the same graphics data in each of buffers excluding a buffer on which a read operation is performed.

In another general aspect, a method of driving a memory comprising multiple buffers includes obtaining memory allocation information based on a multi-write operation command, and storing same graphics data in each of the multiple buffers based on the memory allocation information.

The obtaining may include obtaining, as the memory allocation information, a location of each of the multiple buffers in which the same graphics data is to be stored, according to a multi-write operation command.

The obtaining may include receiving the multi-write operation command from a graphics processor, and determining a memory address and an offset for performing a multi-write operation, based on the multi-write operation command.

The obtaining may include obtaining the memory allocation information based on a parameter included in the multi-write operation command and a layout of the memory.

The storing may include storing the same graphics data simultaneously in the multiple buffers.

The storing may include, in response to the memory being driven according to a double buffer method, storing the same graphics data in each of a proxy buffer that substitutes for a buffer on which a read operation is performed, and a buffer on which a read operation is not performed.

The storing may include, in response to the memory being driven according to an Nth multiple buffer method, wherein N is an integer equal to or greater than 3, storing the same graphics data in each of buffers excluding a buffer on which a read operation is performed.

In another general aspect, a non-transitory computer-readable storage medium stores instructions that, when executed by a processor, cause the processor to perform the method described above.

In another general aspect, a graphics processing apparatus includes a graphics processor, a memory apparatus, including a memory controller configured to obtain memory allocation information based on a multi-write operation command, and a memory configured to store same graphics data in each of the multiple buffers based on the memory allocation information, and a display configured to display the graphics data, wherein the memory apparatus shares graphics data with the graphics processor, receives a control signal requesting for graphics data from the display through the data bus, and transmits the graphics data to the display in response.

The memory controller may obtain, as the memory allocation information, a location of each of the multiple buffers in which the same graphics data is to be stored, according to a multi-write operation command.

The memory controller may receive the multi-write operation command from the graphics processor, and may determine a memory address and an offset for performing a multi-write operation, based on the multi-write operation command.

The memory controller may obtain the memory allocation information based on a parameter included in the multi-write operation command and a layout of the memory.

The memory may store the same graphics data simultaneously in the multiple buffers.

Other features and aspects will be apparent from the following detailed description, the drawings, and the claims.

BRIEF DESCRIPTION OF THE DRAWINGS

FIGS. 6A and 6B are diagrams for describing examples of differences according to performing of a multi-write operation when the memory of the memory apparatus is driven according to the double buffer method.

FIGS. 7A and 7B are diagrams for describing examples of frame differences according to performing of the multi-write operation when the memory of the memory apparatus is driven according to the double buffer method and for comparing examples of effects of the frame differences.

FIGS. 9A and 9B are diagrams for describing examples of frame differences according to performing of the multi-write operation when the memory of the memory apparatus is driven according to a triple buffer method and for comparing examples of effects of the frame differences.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
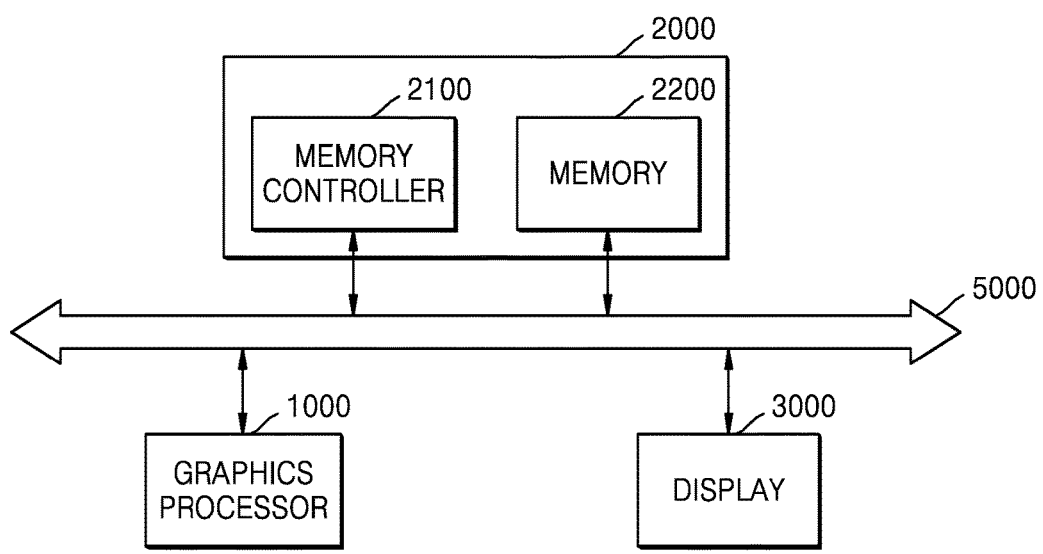
FIG. 1 is a diagram for describing an example of a memory apparatus and an example of a graphics processing environment or apparatus in which the memory apparatus is driven.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Reference is now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

It is to be understood that although the terms "first", "second", etc. may be used herein to describe various components, these components should not be limited by these terms. These components are only used to distinguish one component from another.

Embodiments relate to a memory apparatus including multiple buffers and a method of driving a memory including multiple buffers, and details that are widely known are not described in detail.

FIG. 1 is a diagram for describing an example of a memory apparatus 2000 and a graphics processing environment or apparatus in which the memory apparatus 2000 operates.

Referring to FIG. 1, the memory apparatus 2000 is connected to a graphics processor 1000 and a display 3000 through a data bus 5000. The memory apparatus 2000 may transmit and receive graphics data, various control signals, and so on, to and from the graphics processor 1000 through the data bus 5000. Also, the memory apparatus 2000 may receive a control signal requesting for graphics data from the display 3000 through the data bus 5000, and transmit the graphics data to the display 3000 in response.

The memory apparatus 2000 includes a memory controller 2100 and a memory 2200. The memory controller 2100 store data in and reads data from the memory 2200.

Figure 2:
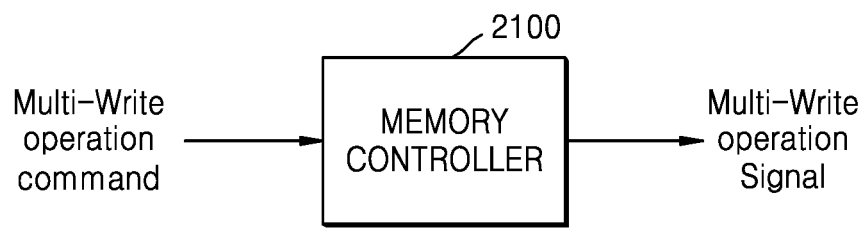
FIG. 2 is a diagram for describing an example of an operation of a memory controller of the memory apparatus.

FIG. 2 is a diagram for describing example of an operation of the memory controller 2100 of the memory apparatus 2000.

Referring to the example of FIG. 2, the memory controller 2100 may receive a multi-write operation command and output a multi-write operation signal in response to the multi-write operation command. For example, when the memory apparatus 2000 receives the multi-write operation command from the graphics processor 1000, the multi-write operation command is input into the memory controller 2100. The memory controller 2100 obtains memory allocation information and outputs the multi-write operation signal corresponding to the memory allocation information so that the multi-write operation command is performed in the memory 2200. Graphics data to be stored in the memory 2200 may be transmitted together with the multi-write operation command, or may be included in the multi-write operation command. Alternatively, information about a location where the graphics data is currently stored may be included in the multi-write operation command.

The memory controller 2100 obtains the memory allocation information based on the multi-write operation command. Data to be considered during memory allocation may be determined by analyzing various types of parameters included in the multi-write operation command.

The memory controller 2100 may obtain, as the memory allocation information, a location of each of multiple buffers in which the same graphics data is to be stored, according to one multi-write operation command. For example, the memory controller 2100 may receive the multi-write operation command from the graphics processor 1000, and determine a memory address and an offset for performing a multi-write operation. Accordingly, the memory controller 2100 knows a layout of the memory 2200 in advance, and may determine the memory allocation information according to the layout of the memory 2200.

The memory controller 2100 may obtain the memory allocation information based on at least one parameter included in the multi-write operation command and the layout of the memory 2200.

The memory controller 2100 controls the memory 2200 to perform the multi-write operation by outputting the multi-write operation signal corresponding to the memory allocation information to the memory 2200.

Figure 3:
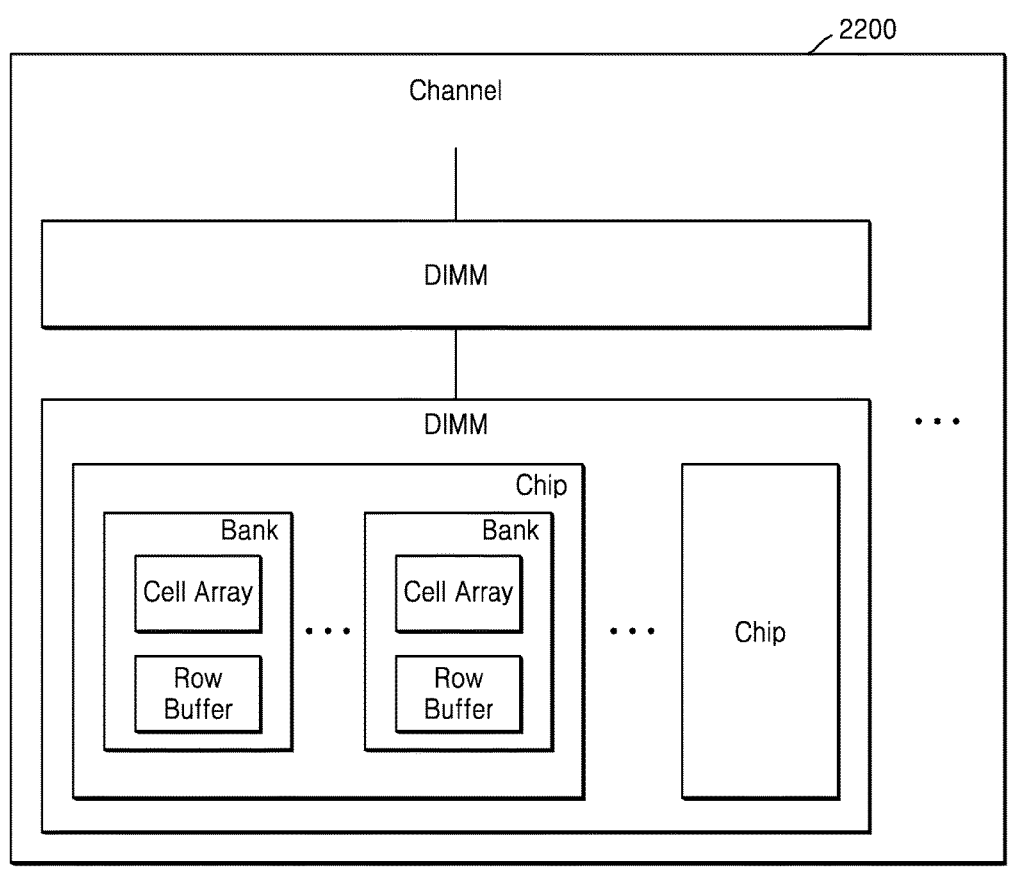
FIG. 3 is a diagram for describing an example of a structure of a memory of the memory apparatus.

FIG. 3 is a diagram for describing an example of a structure of the memory 2200 of the memory apparatus 2000.

The memory 2200 includes a plurality of channels through which data moves. Referring to the example of FIG. 3, one channel is configured with a plurality of dual in-line memory modules (DIMMs). One DIMM may include a plurality of chips. One chip may include a plurality of banks. One bank may include a cell array for storing data, and a row buffer for temporarily storing data stored in a certain row of the cell array. Data stored in the cell array may be accessed by using column and row addresses of the cell array. At this time, costs may be reduced by loading all pieces of data corresponding to a row including data to be accessed to the row buffer, and using the row buffer for other pieces of data included in the row.

As shown in the example of FIG. 3, each bank may include the cell array and the row buffer.

Figure 4A:
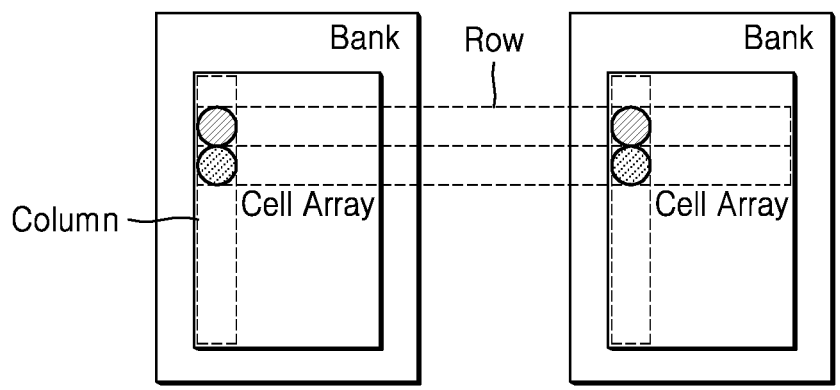
FIGS. 4A through 4C are diagrams for describing examples of a memory allocating method of a memory apparatus.
Figure 4B:
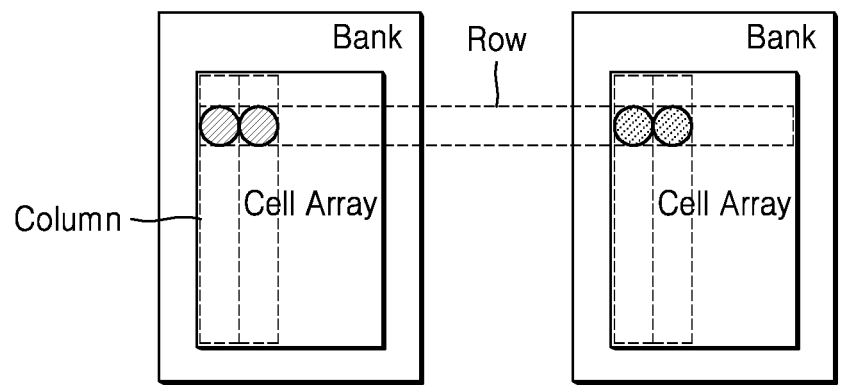
Figure 4C:
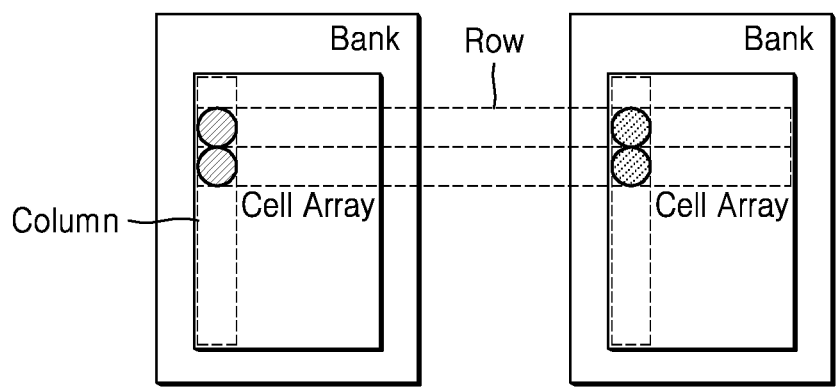

FIGS. 4A through 4C are diagrams for describing examples of a memory allocating method of the memory apparatus 2000.

FIG. 4A illustrates a memory allocation method when the same graphics data is stored in different banks. In FIG. 4A, for convenience of description, only a cell array in a bank is illustrated. The same graphics data may be stored in corresponding locations of the cell arrays in the banks. For example, when the same graphics data is stored in different banks of the same chip in the same DIMM in the same channel of the memory 2200, locations in which the same graphics data are to be stored in cell arrays of the banks may correspond to each other in terms of rows and columns. In such an example, the same graphics data is stored in different cell arrays with a certain offset.

FIGS. 4B and 4C illustrate memory allocation methods when the same graphics data is stored in the same bank. In FIGS. 4B and 4C, for convenience of description, only a cell array in a bank is illustrated. For example, the same graphics data may be stored in adjacent columns or adjacent rows in a cell array of the same bank. Locations of adjacent columns or adjacent rows may be determined according to a size of graphics data. For example, when the same graphics data is stored in the same bank of the same chip in the same DIMM in the same channel of the memory 2200, locations where the same graphics data is stored in the cell array of the bank may be locations of adjacent columns as shown in FIG. 4B or locations of adjacent rows as shown in FIG. 4C.

Figure 5:
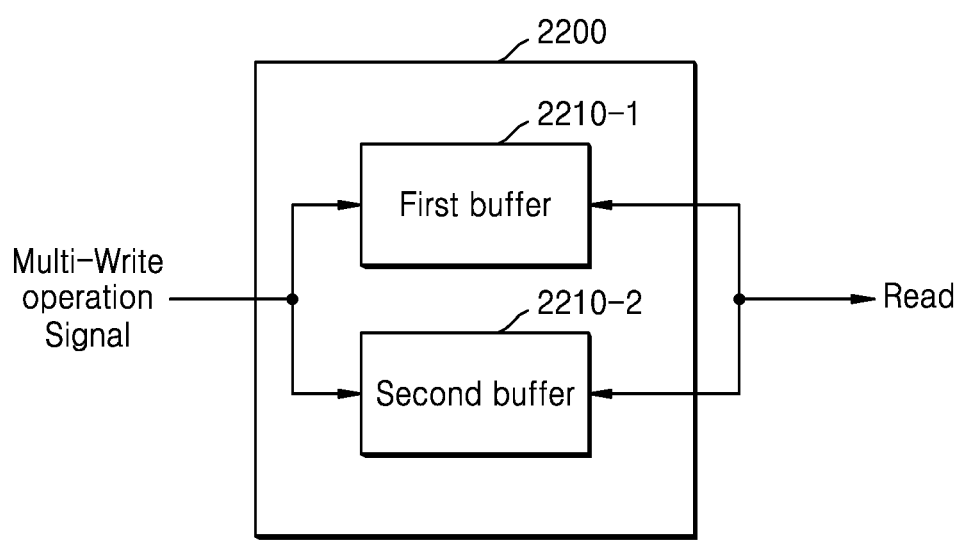
FIG. 5 is a diagram for describing an example of the memory of the memory apparatus driven according to a double buffer method.

FIG. 5 is a diagram for describing the memory 2200 of the memory apparatus 2000 driven according to a double buffer method.

Referring to the example of FIG. 5, the memory 2200 stores data by driving two buffers, that is, first and second buffers 2210-1 and 2210-2, and outputs the stored data according to an external request. In the example of FIG. 5, the first and second buffers 2210-1 and 2210-2 may be physically separated buffers or may be different regions divided in one buffer.

Furthermore, referring to the example of FIG. 5, the memory 2200 may receive a multi-write operation signal and store the same graphics data in the first and second buffers 2210-1 and 2210-2. The multi-write operation signal may drive the memory 2200 to store the same graphics data in the first and second buffers 2210-1 and 2210-2 appropriately based on memory allocation information. For example, the memory 2200 may store the same graphics data simultaneously in the first and second buffers 2210-1 and 2210-2.

The memory 2200 may output graphics data stored in the memory 2200 in response to a read operation signal input being received from an external source. When the read operation signal is input into the memory 2200 and a read operation is performed on the graphics data stored in the memory 2200, the memory 2200 is required to drive multiple buffers such that the read operation does not collide with the performance of a multi-write operation. In other words, data is unable to be stored in a buffer while graphics data stored in the same buffer is being processed.

For example, as shown in the example of FIG. 5, when the memory 2200 is driven according to the double buffer method, performance of a multi-write operation on the first and second buffers 2210-1 and 2210-2 may be delayed until a read operation performed on graphics data corresponding to a current frame is completed. However, in this example, the meaning of the double buffer method that storing and processing may be simultaneously performed may be lost. As another alternative example, a proxy buffer substituting for a buffer on which a read operation is performed may be used, and a multi-write operation may be performed on the proxy buffer and a buffer on which a read operation is not performed. In other words, when a read operation is performed on the first buffer 2210-1 such that as graphics data of a current frame is output, a multi-write operation of graphics data of a subsequent frame may be performed on the second buffer 2210-2 and a first proxy buffer substituting for the first buffer 2210-1. As a result, when a read operation is performed on the second buffer 2210-2 such that the graphics data of the subsequent frame is output, a multi-write operation of graphics data of a next subsequent frame is performed on a second proxy buffer and the first buffer 2210-1 while the graphics data of the subsequent frame stored in the first proxy buffer is stored in the first buffer 2210-1. By using the proxy buffers, it is possible to help manage and avoid issues with collisions.

Figure 6B:
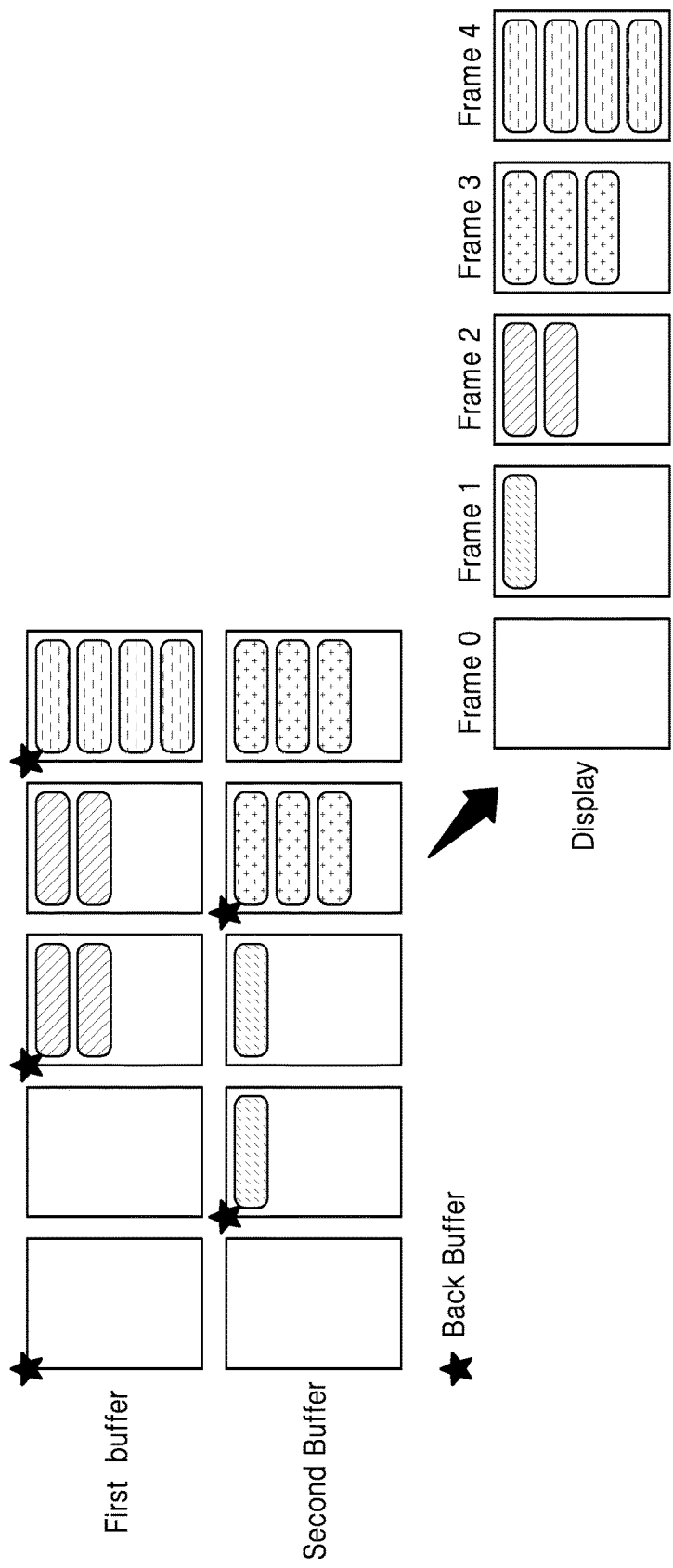

FIGS. 6A and 6B are diagrams for describing differences according to performing of a multi-write operation when the memory 2200 of the memory apparatus 2000 is driven according to the double buffer method.

A back buffer marked with a star in FIGS. 6A and 6B is a buffer on which a data process is performed, and the back buffer is a buffer that outputs stored graphics data to the display 3000 when a read operation signal is input from the display 3000.

In the example of FIG. 6A, a multi-write operation of the same graphics data is performed on the first and second buffers 2210-1 and 2210-2 of the memory 2200, and pieces of graphics data stored in the memory 2200 are processed and sequentially displayed.

Referring to the example of FIG. 6A, graphics data of a current frame is stored in each of the first and second buffers 2210-1 and 2210-2, and the graphics data stored in any one of the first and second buffers 2210-1 and 2210-2 is processed and displayed. Then, graphics data of a subsequent frame is stored in each of the first and second buffers 2210-1 and 2210-2, and the subsequent frame is displayed by processing the graphics data of the subsequent frame stored in one of the first and second buffers 2210-1 and 2210-2, which did not process the graphics data of the current frame. Accordingly, the same graphics data is stored in each of the first and second buffers 2210-1 and 2210-2.

On the other hand, in the example of FIG. 6B, when a graphics data process is performed on any one of two buffers, the two buffers are driven in a manner of performing a write operation on the other buffer without performing a multi operation, accordingly processing pieces of graphics data stored in the memory 2200 and sequentially displaying the pieces of graphics data.

Referring to the example of FIG. 6B, while graphics data of a first frame is stored in the second buffer 2210-2, and the graphics data of the first frame is processed and displayed, graphics data of a second frame is stored in the first buffer 2210-1. While the graphics data of the second frame stored in the first buffer 2210-1 is processed and displayed, graphics data of a third frame is stored in the second buffer 2210-2. While the graphics data of the third frame stored in the second buffer 2210-2 is processed and displayed, graphics data of a fourth frame is stored in the first buffer 2210-1. Subsequently, the graphics data of the fourth frame stored in the first buffer 2210-1 is processed and displayed.

As a result, comparing FIGS. 6A and 6B, pieces of graphics data stored in the first and second buffers 2210-1 and 2210-2 of the memory 2200 are different based on whether a multi-write operation is performed. In the example of FIG. 6A, the same graphics data is stored in two buffers when a multi-write operation is performed. By contrast, in the example of FIG. 6B, since storing and processing of graphics data are alternately performed in two buffers, pieces of graphics data stored in the two buffers are different from each other.

Also, in the example of FIG. 6A, since pieces of graphics data of frames are sequentially stored in each buffer, a frame difference indicating a graphics data variation between a current frame and a previous frame is relatively small. For example, in the example of FIG. 6A, graphics data of a third frame is stored before graphics data of a fourth frame is stored.

However, in the example of FIG. 6B, since pieces of graphics data of frames are alternately stored in two buffers, a frame difference indicating a graphics data variation between a current frame and a previous frame is relatively large. For example, in the example of FIG. 6B, graphics data of a second frame is stored before graphics data of a fourth frame is stored in the first buffer 2210-1.

Figure 7A:
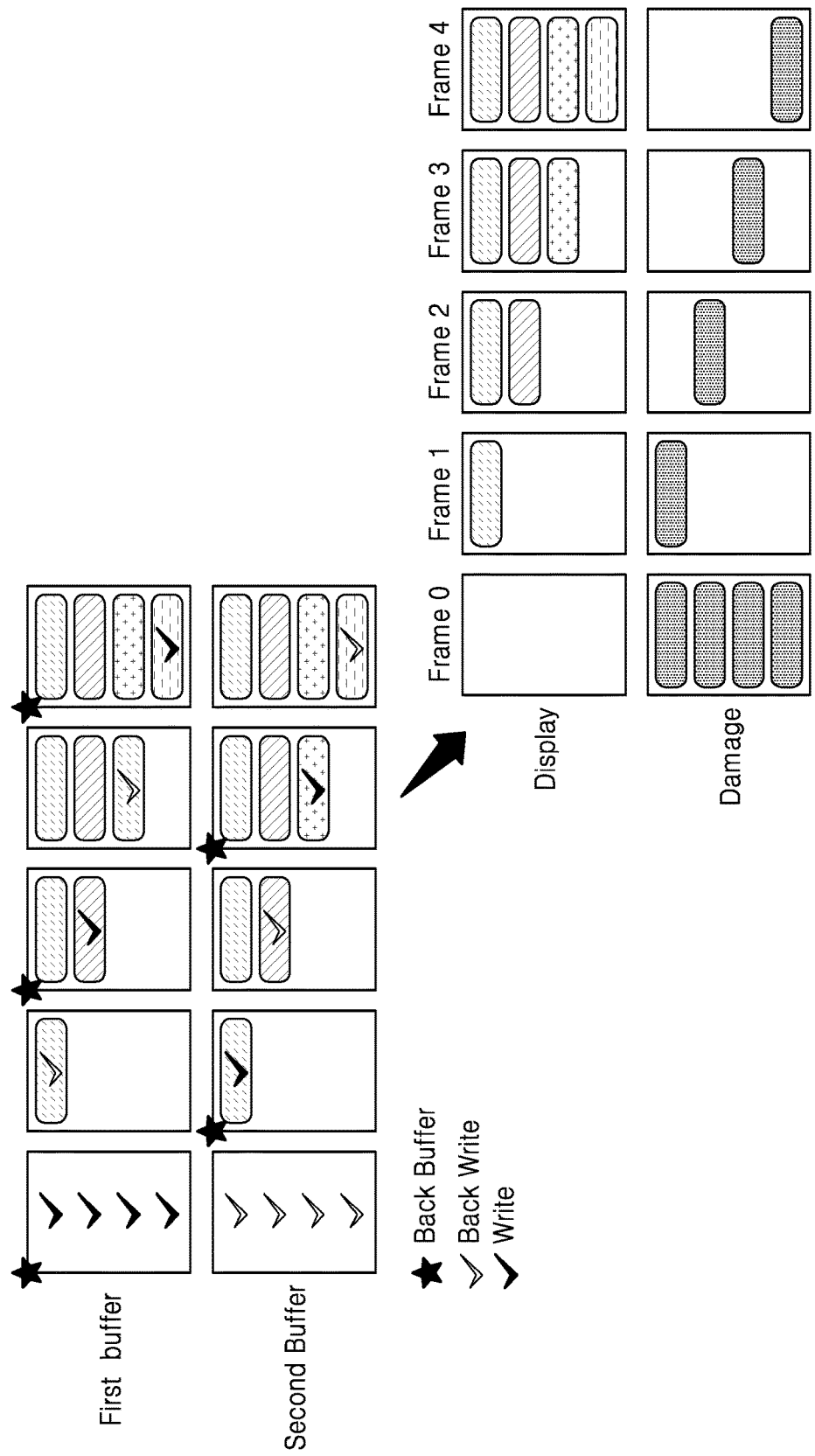

FIGS. 7A and 7B are diagrams for describing examples of frame differences according to performing of the multi-write operation when the memory 2200 of the memory apparatus 2000 is driven according to the double buffer method and for comparing examples of effects of the frame differences.

There are various technologies that use a frame difference during graphics rendering. A technology using such a frame difference may use a multiple buffer driving method in which a multi-write operation is performed as described above with reference to the example of FIG. 6A.

For example, according to a technology in which only when an image of a tile obtained by splitting one image is different from an image stored in a frame buffer, the tile is transmitted from a tile buffer to the frame buffer, and when the image of the tile is the same as the image stored in the frame buffer, the tile is discarded, performance of the technology may be increased when a difference between a previous frame and a current frame is decreased.

A back buffer, as marked by a star in FIGS. 7A and 7B, is a buffer in which data is processed, and may additionally store only graphics data corresponding to a frame difference by comparing graphics data of a previous frame and graphics data of a current frame, and may output the stored graphics data to the display 3000.

Referring to the example of FIG. 7A, only graphics data corresponding to a frame difference is stored in each of the first and second buffers 2210-1 and 2210-2. Furthermore, graphics data stored in any one of the first and second buffers 2210-1 and 2210-2 is processed and displayed. In the example of FIG. 7A, graphics data marked by 'Write' is graphics data additionally stored from a back buffer, and graphics data marked by 'Back Write' is graphics data additionally stored together according to a multi-write operation from another buffer that is not a back buffer. As a result, the same graphics data is stored in each of the first and second buffers 2210-1 and 2210-2 according to frames, and since only graphics data corresponding to a frame difference between a previous frame and a current frame is additionally stored according to frames, an amount of data to be stored during one multi-write operation may be reduced by using such an approach.

Meanwhile, in the example of FIG. 7B, when graphics data is processed with respect to any one of two buffers, the two buffers are driven in a manner of performing a write operation in the other buffer without performing a multi-write operation, and accordingly an amount of data that is to be additionally stored in a buffer, as graphics data corresponding to a frame difference between a previous frame and a current frame, is larger than that of the example of FIG. 7A. Referring to a region marked by 'Damage' in FIGS. 7A and 7B, a graphics data variation corresponding to a frame difference is larger in the example of FIG. 7B than in the example of FIG. 7A even if the same technology is used. Alternatively put, when a technology of additionally storing only graphics data corresponding to a frame difference between two frames is used, a multiple buffer method performing a multi-write operation of the example FIG. 7A has a smaller frame difference than that of the example of FIG. 7B.

Figure 8:
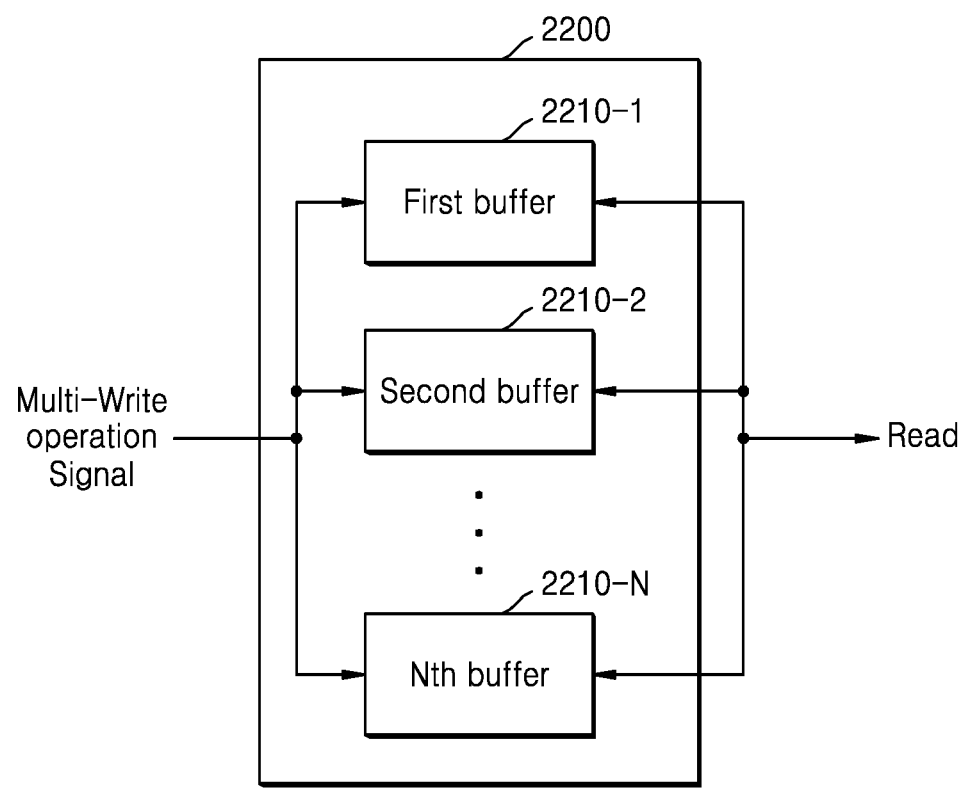
FIG. 8 is a diagram for describing an example of the memory of the memory apparatus driven according to an Nth multiple buffer method.

FIG. 8 is a diagram for describing an example of the memory 2200 of the memory apparatus 2000 driven according to an Nth multiple buffer method.

Referring to the example of FIG. 8, the memory 2200 stores data by driving N buffers, that is, first through Nth buffers 2210-1 through 2210-N and outputs stored data according to a corresponding external request. In FIG. 8, the first through Nth buffers 2210-1 through 2210-N may be physically separated buffers or may be regions divided in one buffer.

Referring to the example of FIG. 8, the memory 2200 may receive a multi-write operation signal and may store the same graphics data in the first through Nth buffers 2210-1 through 2210-N. The multi-write operation signal may drive the memory 2200 to store the same graphics data in the first through Nth buffers 2210-1 through 2210-N based on memory allocation information. The memory 2200 may store the same graphics data simultaneously in the first through Nth buffers 2210-1 through 2210-N.

In response to a read operation signal input being received from an external source, the memory 2200 may output graphics data stored therein. When a read operation is performed on graphics data stored in the memory 2200 as a read operation signal is input into the memory 2200, the memory 2200 is required to drive multiple buffers such that the read operation does not collide with a multi-write operation. As described above with reference to the example of FIG. 5, a method of delaying a multi-write operation or a method of using a proxy buffer may be used such that data is not stored in a buffer while the buffer is processing stored graphics data.

Also, when a number of multiple buffers included in the memory 2200 is at least three, a multi-write operation may be performed on buffers excluding a buffer on which a read operation is performed. As shown in the example of FIG. 8, when the memory 2200 is driven according to the Nth multiple buffer method, the same graphics data may be stored by performing a multi-write operation on buffers excluding a buffer on which a read operation is performed. For example, when a read operation is performed on the first buffer 2210-1 such that graphics data of a current frame is output, a multi-write operation of graphics data of a subsequent frame is performed on the second through Nth buffers 2210-2 through 2210-N excluding the first buffer 2210-1, and accordingly the same graphics data of the subsequent frame may be stored in the second through Nth buffers 2210-2 through 2210-N. Subsequently, for convenience of description, differences of performing a multi-write operation are described based on a triple buffer method, in the example when N is 3. However, N is not limited to 3 and may have a greater value, as appropriate.

FIGS. 9A and 9B are diagrams for describing examples of frame differences according to performing of the multi-write operation when the memory 2200 of the memory apparatus 2000 is driven according to a triple buffer method and for comparing effects of the frame differences.

In the example of FIG. 9A, a technology of performing a multi-write operation on the first through third buffers 2210-1 through 2210-3 of the memory 2200 while additionally storing only graphics data corresponding to a frame difference is applied, such that pieces of graphics data stored in the memory 2200 are processed and sequentially displayed. In the example of FIG. 9A, a region marked with 'Write' corresponds to graphics data additionally stored from a back buffer, and a region marked with 'Back Write' corresponds to graphics data additionally stored according to a multi-write operation from a buffer that is not a back buffer. Also, in a region marked with 'No Write,' graphics data is different from a previous frame, but previous graphics data is maintained.

Referring to the example of FIG. 9A, from among the first through third buffers 2210-1 through 2210-3, graphics data of a current frame is stored in each buffer excluding a buffer on which a data process, such as a read operation, is performed. At such a time, only a value corresponding to a frame difference between a previous frame and a current frame may be stored.

Meanwhile, in the example of FIG. 9B, only graphics data corresponding to a frame difference is additionally stored without performing a multi-write operation. In this example, three buffers are rotationally driven such that pieces of graphics data stored in the memory 2200 are processed and subsequently sequentially displayed.

Referring to the example of FIG. 9B, while graphics data of a first frame is stored in the second buffer 2210-2, and then the graphics data of the first frame is processed and displayed, graphics data of a second frame is stored in the third buffer 2210-3. At this time, because there is no identical graphics data between a previous frame and the second frame stored in the third buffer 2210-3, a technology, as discussed, of additionally storing only graphics data corresponding to a frame difference is not applied. While the third buffer 2210-3 processes and displays the graphics data of the second frame, graphics data of a third frame is stored in the first buffer 2210-1. At this time, because there is no identical graphics data between a previous frame and the third frame stored in the first buffer 2210-1, a technology of additionally storing only graphics data corresponding to a frame difference is not applied. While the first buffer 2210-1 processes and displays the graphics data of the third frame, graphics data of a fourth frame is stored in the second buffer 2210-2. At this time, since the second buffer 2210-2 maintains the graphics data of the first frame as a previous frame, the graphics data of the fourth frame may be stored by additionally storing graphics data obtained by excluding the graphics data of the first frame from the graphics data of the fourth frame. Then, the graphics data of the fourth frame stored in the second buffer 2210-2 is processed and displayed.

In the FIG. 9B, three buffers are rotationally driven in a manner such that when one of the three buffers processes graphics data, a write operation is performed on one of the remaining two buffers, without performing a multi-write operation, and thus an amount of data to be additionally stored in a buffer as graphics data corresponding to a frame difference between a previous frame and a current frame is larger than that of the example of FIG. 9A.

As a result, in the example of FIG. 9A, a frame difference indicating a graphics data variation between a current frame and a previous frame in each buffer is relatively small as a multi-write operation is performed, as compared to the frame difference for the example of FIG. 9B. Even with reference to regions marked by 'Damage' in FIGS. 9A and 9B, a graphics data variation corresponding to a frame difference is larger in the example FIG. 9B than the example of 9A. Such similar results may be obtained even when not only a technology of additionally storing only graphics data corresponding to a frame difference is used, but also when another graphics rending technology using a frame difference is used.

Figure 10:
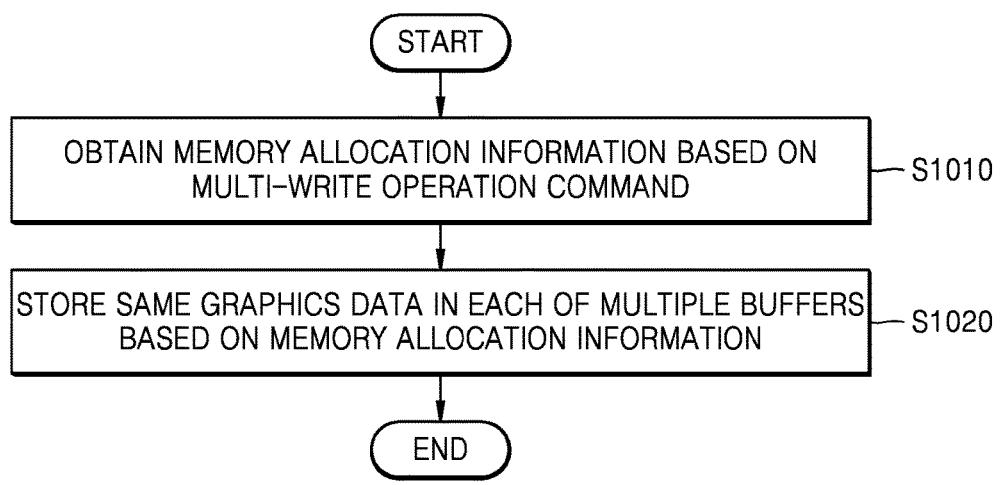
FIG. 10 is a flowchart of an example of a method of driving a memory including multiple buffers.

FIG. 10 is a flowchart of an example of a method of driving the memory 2200 including multiple buffers. The method of FIG. 10 may be performed by the memory apparatus 2000.

In operation S1010, the method may obtain memory allocation information based on a multi-write operation command. For example, the memory apparatus 2000 may obtain memory allocation information based on a multi-write operation command. The memory apparatus 2000 may obtain, as the memory allocation information, a location of each of the multiple buffers in which the same graphics data is to be stored, according to one multi-write operation command. The memory apparatus 2000 may receive the multi-write operation command from a graphics processor, and determine a memory address and an offset for performing a multi-write operation. The memory apparatus 2000 may obtain the memory allocation information based on at least one parameter included in the multi-write operation command and a layout of the memory 2200.

In operation S1020, the method may store the same graphics data in each of the multiple buffers based on the memory allocation information. For example, the memory apparatus 2000 may store the same graphics data in each of the multiple buffers based on the memory allocation information. The memory apparatus 2000 may store the same graphics data simultaneously in the multiple buffers. When the memory 2200 is driven according to a double buffer method, the memory apparatus 2000 may store the same graphics data in a proxy buffer substituting for a buffer on which a read operation is performed and a buffer on which a read operation is not performed. When the memory 2200 is driven in an Nth multiple buffer method, the memory apparatus 2000 may store the same graphics data in each of buffers excluding a buffer on which a read operation is performed.

Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A memory apparatus comprising:
multiple buffers;
a memory controller connected to each of the multiple buffers, the memory controller configured to,
obtain memory allocation information and graphics data based on a multi-write operation command, and
determine a frame difference between the obtained graphics data and graphics data stored in each of the multiple buffers; and
a memory configured to store the obtained graphics data as same graphics data in each of the multiple buffers based on the memory allocation information and results of the determining the frame difference.

2. The memory apparatus of claim 1, wherein the memory controller is further configured to:
obtain, as the memory allocation information, a location of each of the multiple buffers in which the same graphics data is to be stored, according to the multi-write operation command.

3. The memory apparatus of claim 1, wherein the memory controller is further configured to:
receive the multi-write operation command from a graphics processor; and
determine a memory address and an offset for performing a multi-write operation based on the multi-write operation command.

4. The memory apparatus of claim 1, wherein the memory controller is further configured to:
obtain the memory allocation information based on a parameter included in the multi-write operation command and a layout of the memory.

5. The memory apparatus of claim 1, wherein the memory is further configured to:
store the same graphics data simultaneously in the multiple buffers.

6. The memory apparatus of claim 1, wherein the memory is further configured to, in response to the memory being driven according to a double buffer method:
store the same graphics data in each of a proxy buffer that substitutes for a buffer on which a read operation is performed, and a buffer on which a read operation is not performed.

7. The memory apparatus of claim 1, wherein the memory is further configured to, in response to the memory being driven according to an Nth multiple buffer method, and N is an integer equal to or greater than 3:
store the same graphics data in each of buffers excluding a buffer on which a read operation is performed.

8. A method of driving a memory comprising multiple buffers, the method comprising:
obtaining memory allocation information based on a multi-write operation command using a memory controller connected to each of the multiple buffers;
determining a frame difference between the obtained graphics data and graphics data stored in each of the multiple buffers; and
storing the obtained graphics data as same graphics data in each of the multiple buffers based on the memory allocation information and results of the determining the frame difference.

9. The method of claim 8, wherein the obtaining comprises obtaining, as the memory allocation information, a location of each of the multiple buffers in which the same graphics data is to be stored, according to a multi-write operation command.

10. The method of claim 8, wherein the obtaining comprises:
receiving the multi-write operation command from a graphics processor; and
determining a memory address and an offset for performing the multi-write operation, based on the multi-write operation command.

11. The method of claim 8, wherein the obtaining comprises obtaining the memory allocation information based on a parameter included in the multi-write operation command and a layout of the memory.

12. The method of claim 8, wherein the storing comprises storing the same graphics data simultaneously in the multiple buffers.

13. The method of claim 8, wherein the storing comprises, in response to the memory being driven according to a double buffer method, storing the same graphics data in each of a proxy buffer that substitutes for a buffer on which a read operation is performed, and a buffer on which a read operation is not performed.

14. The method of claim 8, wherein the storing comprises, in response to the memory being driven according to an Nth multiple buffer method, and N is an integer equal to or greater than 3, storing the same graphics data in each of buffers excluding a buffer on which a read operation is performed.

15. A non-transitory computer-readable storage medium storing instructions that, when executed by at least one processor, cause the at least one processor to perform the method of claim 8.

16. A graphics processing apparatus, comprising:
a graphics processor;
a memory apparatus comprising,
a memory controller connected to multiple buffers, the memory controller configured to,
obtain memory allocation information and graphics data based on a multi-write operation command, and
determine a frame difference between the obtained graphics data and graphics data stored in each of the multiple buffers, and
a memory configured to store the obtained graphics data as same graphics data in each of the multiple buffers based on the memory allocation information and results of the determining the frame difference; and
a display configured to display the graphics data stored in at least one of the multiple buffers, wherein
the memory apparatus is further configured to,
share the graphics data stored in at least one of the multiple buffers with the graphics processor, receive a control signal requesting for the graphics data stored in at least one of the multiple buffers from the display through a data bus, and transmit the requested graphics data to the display in response.

17. The graphics processing apparatus of claim 16, wherein the memory controller is further configured to obtain, as the memory allocation information, a location of each of the multiple buffers in which the same graphics data is to be stored, according to the multi-write operation command.

18. The graphics processing apparatus of claim 16, wherein the memory controller is further configured to:

receive the multi-write operation command from the graphics processor; and determine a memory address and an offset for performing a multi-write operation, based on the multi-write operation command.

19. The graphics processing apparatus of claim 16, wherein the memory controller is further configured to obtain the memory allocation information based on a parameter included in the multi-write operation command and a layout of the memory.

20. The graphics processing apparatus of claim 16, wherein the memory is further configured to store the same graphics data simultaneously in the multiple buffers.

* * * * *